Feb. 28, 1961  A. KRAMER ET AL  2,972,884
TENDERNESS TESTING APPARATUS FOR FOOD PRODUCTS
Filed Aug. 7, 1956  2 Sheets-Sheet 1

INVENTORS
*AMIHUD KRAMER*
*GILBERT NIELSEN*
*SAMUEL BRYAN*
BY
Homer R. Montague
ATTORNEY Feb. 28, 1961  A. KRAMER ET AL  2,972,884
TENDERNESS TESTING APPARATUS FOR FOOD PRODUCTS
Filed Aug. 7, 1956  2 Sheets-Sheet 2

INVENTORS
AMIHUD KRAMER
GILBERT NIELSEN
SAMUEL BRYAN
BY Homer R. Montague
ATTORNEY

United States Patent Office 2,972,884
Patented Feb. 28, 1961

2,972,884

TENDERNESS TESTING APPARATUS FOR FOOD PRODUCTS

Amihud Kramer, Silver Spring, Gilbert Nielsen, District Heights, and Samuel Bryan, Silver Spring, Md., assignors to L.E.E., Inc., Washington, D.C., a corporation of Maryland Filed Aug. 7, 1956, Ser. No. 602,590

3 Claims. (Cl. 73—101)

This invention pertains to testing apparatus, and more particularly to apparatus for testing the tenderness of food products, either as an aid in determining the proper time for harvesting, or for appraising the quality of such products at any stage in their preparation for market or for processing.

Numerous efforts have been made to establish reproducible standards of tenderness for foods and food products, but all such efforts have been rendered relatively futile because of the difficulty in providing quantitative standards of tenderness. One promising approach to the problem involves the use of a standardized container or cell, within which a suitable quantity of the product being tested is placed, and the product then penetrated by a multiple bladed ram. The ram in passing through the material operates to shear the individual particles or fibers, and the force necessary to produce penetration is considered a measure of the tenderness of the product. Under carefully controlled conditions, the numerical value of force or thrust for a given product has been found to have a good correlation with the tenderness as judged by experts on a subjective basis. Apparatus of the kind just described has come to be known as a "shear press" because of its similarity to commercial presses for other purposes.

In the operation of testers of the above type, it has been learned that the rate at which the ram is driven through the test cell is an important parameter which must be controlled if the end result is to be accurate and reproducible. This fact sets a limitation on the type of force-applying mechanisms which can be utilized, and it has been found that a hydraulic system for the purpose provides a nicely controllable driving source. The present invention will be described in connection with a hydraulic drive, but it will be understood that the invention is not to be limited to such a drive, but can be utilized with other types so long as they provide the necessary control of factors known to be significant in the test results.

Whether the drive is hydraulic or of other type, the mass and inertia of the driving equipment have been found to exert a considerable disturbing effect on the test results. It is a principal object of the present invention to provide improved apparatus of this general type in which the effects of the driving equipment are minimized by making the readings of applied force as nearly as possible at the actual final point of application of such force to the sample or product being tested. In this way, not only variations in the driving equipment, but other sources of variation not related to product tenderness are substantially eliminated from the final readings.

A further object of the invention is to provide an improved design of the parts forming the product cell itself, facilitating rapid and reliable testing of successive samples or batches with a minimum amount of skilled labor. In this connection, and as has been mentioned above, equipment of the type under consideration requires the precise positioning of the cell containing the sample, with reference to the multi-bladed ram. To permit the cell to be disassembled for cleaning and refilling, it has been necessary to withdraw the ram completely from the cell between successive tests. The cell top or lid has guide slots to receive the fingers or blades of the ram, and exact alignment is necessary if the parts are not to be damaged when the very substantial driving force is brought into play. The present invention provides a design for the parts which absolutely ensures correct alignment prior to the application of the testing force.

The above and other objects and advantages of the invention will best be understood by referring now to the following detailed specification of a preferred embodiment thereof, taken in connection with the appended drawings, in which.

Figure 1:
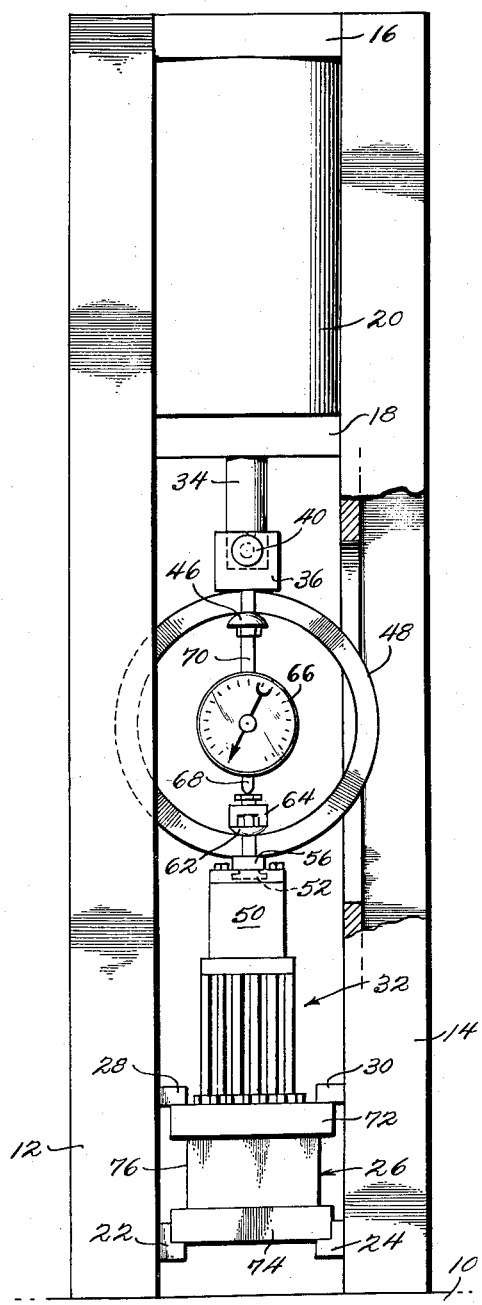
Fig. 1 is a front elevation of a complete tester incorporating the invention, parts being broken away for clarity.

In order to avoid significant distortion of the equipment under load, a strong and rigid framework is required. In Fig. 1, the base member of the equipment is indicated by numeral 10, and upon this are firmly secured a pair of massive upright channel members 12 and 14, connected together at their upper ends as by a plate 16. An intermediate connecting plate 18 serves, along with upper plate 16, to secure in position the hydraulic drive cylinder 20.

Near the bottom of the apparatus, the respective channels 12 and 14 carry rabbetted guide rails 22 and 24, along which the test cell or container 26 can be slid into position from the front of the equipment. Upper rails 28 and 30 engage the top surface of the cell 26 and hold it firmly in position against vertical displacement. The bladed ram 32, which is to be driven through the cell 26 and its contents, is disposed above the cell as shown, being suspended from the piston of the hydraulic cylinder 20 through the intermediary of the test force measuring equipment, as will be described.

Figure 2:
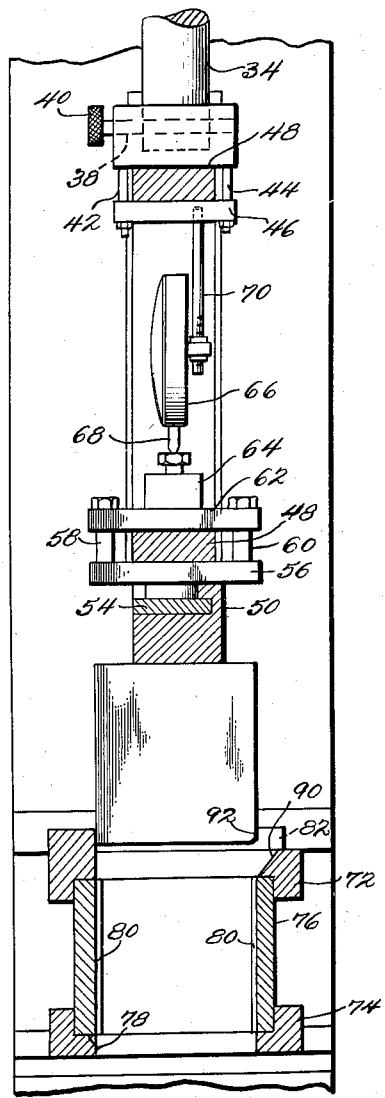
Fig. 2 is a vertical sectional view, to a somewhat larger scale, the section plane being indicated by arrows 2—2 in Fig. 1.

Hydraulic cylinder 20 contains the usual piston, not shown, whose piston rod 34 extends downwardly and terminates in a block 36 socketed to receive the end of the rod, and provided with a connecting pin 38 (Fig. 2) passing through the block and rod and removable for disassembly as by a knob 40. Bolts 42 and 44 connect this block to a pillow 46 whose upper surface is rounded in cylindrical fashion to bear upon the inner surface of a proving ring 48 of a type which is well known in materials testing equipment. Bolts 42 and 44 are provided with nuts at their lower ends to permit changing the proving ring as required.

The upper end of the bladed ram 32 has an integral block 50 provided with a re-entrant groove 52 to receive in removable sliding fashion the foot 54 of a plate 56 engaging the outer rim of the proving ring 48. Plate 56 is connected by bolts 58, 60 to another rounded pillow 62 similar to pillow 46; the bolts hold the parts firmly in contact with ring but are readily removed when it is desired to substitute another ring. A contact block 64 is secured to the pillow 62.

It will be seen from the above that any downward force exerted by the piston rod 34 will be transmitted to the ram 32 by way of ring 48, and that the latter will thus be distorted or flattened out of its normally circular shape. The extent to which the vertical diameter of the ring is reduced will be an accurate measure of the applied force, and the free suspension of all parts from the hydraulic cylinder to the ram will ensure that the resultant indication is not affected by friction, nor to any appreciable degree, by the inertia of the parts. All of the moving parts are of relatively much lower mass than, for example, the hydraulic cylinder and piston.

In order to measure and indicate the force applied to the ram 32 during the travel of the piston rod, a conventional dial gauge 66 is positioned within the ring and with its feeler contact 68 resting upon contact block 64. The bracket of the dial gauge is secured by a rod 70 connected to pillow 46, the lower end of the rod being threaded and provided with nuts so that the gauge can be properly located. The gauge will therefore indicate directly the amount of flattening of ring 48 caused by the reaction of the load encountered by the ram 32, against the thrust of the piston rod 34.

The cell generally indicated by the numeral 26 is actually formed in three parts, a top plate 72, a bottom plate 74, and a hollow body portion 76. Conventionally, the top and bottom plates have been slotted to receive the blades of ram 32 with a very close guiding fit, and both have been rabbetted internally as at 78 (Fig. 2) to ensure precise location of the slots with reference to vertical shallow grooves 80 formed in the inner front and rear faces of the hollow body 76.

Since the ends of the blades are necessarily ground and positioned to form a close fit with the slots of portions 72 and 74, any deviation of the cell 26 from its proper position when the ram descends will cause damage to one part or the other. At the same time, it is necessary to be able to remove the cell 26 after each test. To permit quick and exact location of the mating parts before each test, the present invention provides a special form of top plate 72 which, taken along with proper adjustment of the apparatus, ensures this desired relationship in a fool-proof manner.

Figure 3:
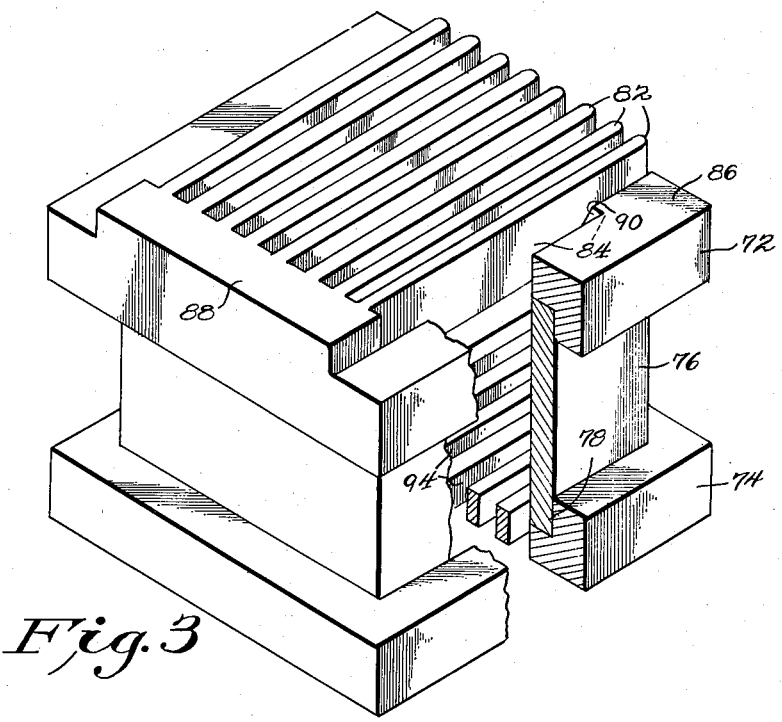
Fig. 3 is a perspective view, partly broken away, of the cell or container of the invention.

Referring now to Fig. 3 of the drawings, it will be seen that the webs or lands lying between adjacent grooves of the top plate 72 extend upwardly above the general upper surface of the top 72; the webs are designated 82, and the grooves 84. By way of example, in a cell having a total height of 3¼ inches, the amount of this upward extension may be about ½ inch. At any rate, the extension is made of such size that when ram 32 is drawn upward to its maximum extent, for any given machine set-up, the blades of the ram still have their tips lying between the webs or lands, although the blade tips will lie above the general top surface 86. The upward extensions of the lands are connected, at the "front" of the cell, to form in effect a solid bar 88.

From what has been said, it will be realized that with the ram 32 in its uppermost position, the cell 26 can be slid into position (from the left in Fig. 2) along guides 22 and 24, the operator making sure that the blades of the ram properly enter between the lands or upward extensions 82, and this before any downward motion of the ram is produced. The cell is inserted until the block 88 engages the blades or fingers, which stops the cell in proper location. To avoid any damage because of incomplete insertion of the cell, the grooves in top plate 72 are chamfered or bevelled as indicated at 90. If desired, the inward lower corners of the ram blades may be slightly rounded, as at 92 in Fig. 2, these two features ensuring good alignment of the parts before the ram descends.

Once proper alignment has been obtained at the top of the cell, alignment with the slots (designated 94 in Fig. 3) of the lower plate 74 will necessarily follow, so that no special treatment is needed at this end of the cell.

Figure 4:
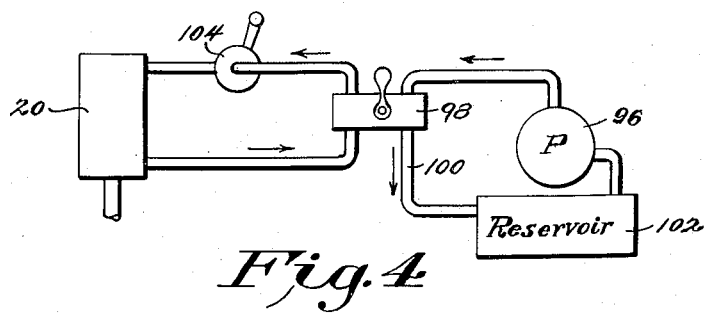
Fig. 4 is a schematic diagram of a suitable hydraulic control system for the ram of this apparatus.

Fig. 4 of the drawings shows in schematic form a typical and suitable power drive system for the apparatus. In this figure, numeral 20 again designates the hydraulic cylinder, the same being supplied by the hydraulic pump 96 feeding the conventional four-way valve 98 whose drain line 100 returns to the sump 102. During the down stroke of the piston, oil flows from valve 98 to the cylinder via a known form of adjustable flow rate valve 104, and the cylinder discharge returns to the sump or reservoir 102 through the four-way valve, the flow direction being indicated by arrows. In the reverse direction, for lifting the piston, this flow is reversed, and if desired the flow may be by-passed through valve 104.

While the invention has been disclosed herein in connection with a single preferred embodiment, it will be understood that the details of construction are given purely in the interest of ready understanding of the invention, and that such details are not to be taken as limiting the scope of the invention except as may be required by the wording of the appended claims.

What is claimed is:

1. A machine for testing the tenderness of materials, comprising a cell having at least one slotted wall, and adapted to contain the material being tested, a bladed ram adapted to move between a position in which its blade tips are clear of the general surface of said slotted wall by a predetermined amount and a position in which it passes through said wall and into said cell, and blade guiding elements comprising lands extending outwardly from the wall portions between adjacent slots by an amount greater than the clearance between said blade tips and the wall surface in the first position of said ram; and said lands being coextensive with said wall portions, the slots formed by the lands being open and unobstructed at least at one end thereof.

2. In a machine for testing the tenderness of food products, the combination including a support, a bladed ram mounted for vertical reciprocating movement on said support, a removable cell having a chamber to receive a quantity of the food to be tested and into which said bladed ram is reciprocated, said cell comprising a slotted top plate, a slotted bottom plate, solid side walls to form a hollow body portion between said plates and said walls, said slotted top plate having upstanding lands extending above said top plate, said lands being open on one side and connected on the opposite side to form a solid bar extending above said top plate, means fixed to said support to guide said cell for forward movement in lengthwise direction of the slots to align them with the respective blades of the ram, said lands acting to receive the marginal edge portions of the ram blades as the cell is moved forwardly into operating position.

3. The invention in accordance with claim 2, in which the slotted wall of said cell has chamfered portions defining the ends of the slots therein, to cooperate with corners of the ram blades for aligning the ram and cell in the lengthwise direction of the slots.

References Cited in the file of this patent

UNITED STATES PATENTS

| Number | Name | Date |
|---|---|---|
| 2,398,192 | Scheminger | Apr. 9, 1946 |
| 2,473,063 | Kerr | June 4, 1949 |
| 2,637,198 | Spangler et al. | May 4, 1953 |

OTHER REFERENCES

Publication: Reprint of article from the Food Packer, December 1948, "Measuring Harvest Quantities," by A. Kramer, pages 5, 5a.